(12) United States Patent
Ballantyne et al.

(10) Patent No.: US 11,722,451 B2
(45) Date of Patent: Aug. 8, 2023

(54) DISTRIBUTING EVENT MESSAGES FROM A FIRST SERVICE TO ADDITIONAL SERVICES USING A MESSAGE STORE

(71) Applicant: Dell Products L.P., Round Rock, TX (US)

(72) Inventors: Robert A. Ballantyne, Mansfield, MA (US); Robert J. Bell, Forest City, NC (US); Cornelis Fredericus Hendriks, Raleigh, NC (US); Karl M. Owen, Chapel Hill, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/544,387

(22) Filed: Dec. 7, 2021

(65) Prior Publication Data
US 2023/0179559 A1 Jun. 8, 2023

(51) Int. Cl.
*H04L 51/42* (2022.01)
*H04L 67/51* (2022.01)

(52) U.S. Cl.
CPC .............. *H04L 51/42* (2022.05); *H04L 67/51* (2022.05)

(58) Field of Classification Search
CPC ................................ H04L 51/42; H04L 67/51
USPC ........................................................ 709/206
See application file for complete search history.

(56) References Cited

U.S. PATENT DOCUMENTS

| 7,844,636 B2* | 11/2010 | Blevins | G06F 9/542 709/206 |
|---|---|---|---|
| 2006/0080120 A1* | 4/2006 | Tcherevik | G06F 16/958 707/E17.116 |
| 2006/0109857 A1* | 5/2006 | Herrmann | H04L 47/34 370/412 |
| 2009/0228563 A1* | 9/2009 | Jones | G06F 9/526 709/206 |

(Continued)

OTHER PUBLICATIONS

Molder, Mark; "Forwarding a webhook to multiple endpoints" posted on Feb. 8, 2016, http://springest.io/forwarding-a-webhook-to-multiple-endpoints, downloaded on Nov. 23, 2021.

(Continued)

*Primary Examiner* — Zi Ye
(74) *Attorney, Agent, or Firm* — Ryan, Mason & Lewis, LLP

(57) ABSTRACT

Techniques are provided for distributing event messages from a first service to additional services using a message store. One method comprises obtaining, by a first service, from a second service, messages associated with the second service, wherein the second service provides a given message, comprising information related to a given event associated with the second service, to the first service in response to an occurrence of the given event; and providing, by the first service, the messages to a message store, wherein each message is published on the message store, and wherein at least one additional service consumes one or more of the published messages on the message store. The message store may comprise a sequential message queue implemented using an event streaming platform. The plurality of messages may also be stored in a data store that supports access (e.g., query access) by the at least one additional service.

20 Claims, 6 Drawing Sheets

(56) References Cited

U.S. PATENT DOCUMENTS

2011/0167433 A1* 7/2011 Appelbaum ...... G06F 16/24565
719/318
2015/0128103 A1* 5/2015 Stratton .................... G06F 8/00
717/100

OTHER PUBLICATIONS

"How Webhook Relays Works"; https://webhookrelay.com/, downloaded on Nov. 23, 2021.
"Best Practices for Using Webhooks"; https://stripe.com/docs/webhooks/best-practices, downloaded on Nov. 23, 2021.

* cited by examiner

```
# CREATE WEBHOOK TO BE USED AS "FIREHOSE" FROM MESSAGE
GENERATING SERVICE

REGISTER WEBHOOK ON SPECIFIED ENDPOINT USING GRAPHICAL
USER INTERFACE (GUI) OR APPLICATION PROGRAMMING
INTERFACE (API) OF MESSAGE GENERATING SERVICE

# MONITOR ENDPOINT, CAPTURE WEBHOOK MESSAGES AND SAVE
WEBHOOK MESSAGES ON ENTERPRISE SERVICE BUS (ESB)
while msg = getWebHookMessage(ENDPOINT); do
    putMessageOnESB(TOPIC, msg)
done

# TAKE CONTENT FROM ESB RELATED TO WEBHOOK MESSAGES
STORED ON ESB AND STORE CONTENT IN DATABASE
while msg = getESBMessage(TOPIC); do
    store msg in DBMS(TOPIC_Table)
done
```

FIG. 4

DISTRIBUTING EVENT MESSAGES FROM A FIRST SERVICE TO ADDITIONAL SERVICES USING A MESSAGE STORE

FIELD

The field relates generally to information processing systems and more particularly, to communications among services using such information processing systems.

BACKGROUND

Different services or applications often communicate using point-to-point communications and other direct connections. As the demand for information grows, however, the load placed on a given service to deliver messages to multiple receiving services can interfere with the normal operating functions of the given service.

Some services or applications communicate using a webhook that allows a particular service to provide another receiving service with real-time information. The messages sent by the particular service using a webhook are typically delivered to a particular network address that is monitored by the receiving service (e.g., a subscribing service) to consume and process the messages.

A need exists for improved techniques for distributing messages among services.

SUMMARY

In one embodiment, a method comprises obtaining, by a first service, from a second service, a plurality of messages associated with the second service, wherein the second service provides a given message, comprising information related to a given event associated with the second service, to the first service in response to an occurrence of the given event; and providing, by the first service, the plurality of messages to a message store, wherein each message is published on the message store, and wherein at least one additional service consumes one or more of the published messages on the message store.

In some embodiments, the message store comprises a sequential message queue implemented using an event streaming platform. The message store may comprise an event stream that serializes the plurality of messages according to a time of each respective message.

In one or more embodiments, the plurality of messages may also be stored in a data store that supports access (e.g., query access) by the at least one additional service. The message store may comprise a plurality of messages generated by a plurality of services and wherein an impact of at least one event associated with at least one given service can be assessed on one or more additional services.

Other illustrative embodiments include, without limitation, apparatus, systems, methods and computer program products comprising processor-readable storage media.

BRIEF DESCRIPTION OF THE DRAWINGS

FIG. 4 illustrates exemplary pseudo code for creating webhooks with the message generating service of FIG. 2 and for processing received webhook messages in accordance with an illustrative embodiment;

DETAILED DESCRIPTION

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for distributing event messages from a first service to additional services using a message store.

In one or more embodiments, techniques are provided for distributing event messages among services using a message store. A message generating service provides one or more event notification messages to a message processing service (for example, using a webhook) in response to an occurrence of corresponding events. The message generating service may be configured to send as much information as possible for as many events as possible to the message processing service. The webhook is considered a light-weight communication mechanism. Thus, the load on the message generating service is reasonable. In addition, in at least some embodiments, there is no duplication of information being sent by the message generating service (e.g., to multiple different consuming services) as the message is sent once to the message processing service, for storage in the message store, and can be read by multiple message consuming services from the message store. This avoids the additional processing required to select messages based on one or more criteria and to publish them to multiple webhooks.

The message processing service provides the messages to a message store, such as an enterprise service bus (ESB), and each message is then published on the message store. One or more message consuming services consume one or more of the published messages on the message store. Automation queries for data can be directed to the ESB (e.g., having highly available, resilient, and redundant storage brokers). Thus, the ESB can provide the necessary information to multiple consuming services to satisfy the previous reporting needs without going directly to the message generating service (or when specific data is not available on the ESB more specific queries can be employed, which is expected to occur less frequently than with previous webhook techniques). The ESB can be scaled in some embodiments to handle an arbitrary number of parallel queries without affecting the performance of the message producing service.

Figure 1:
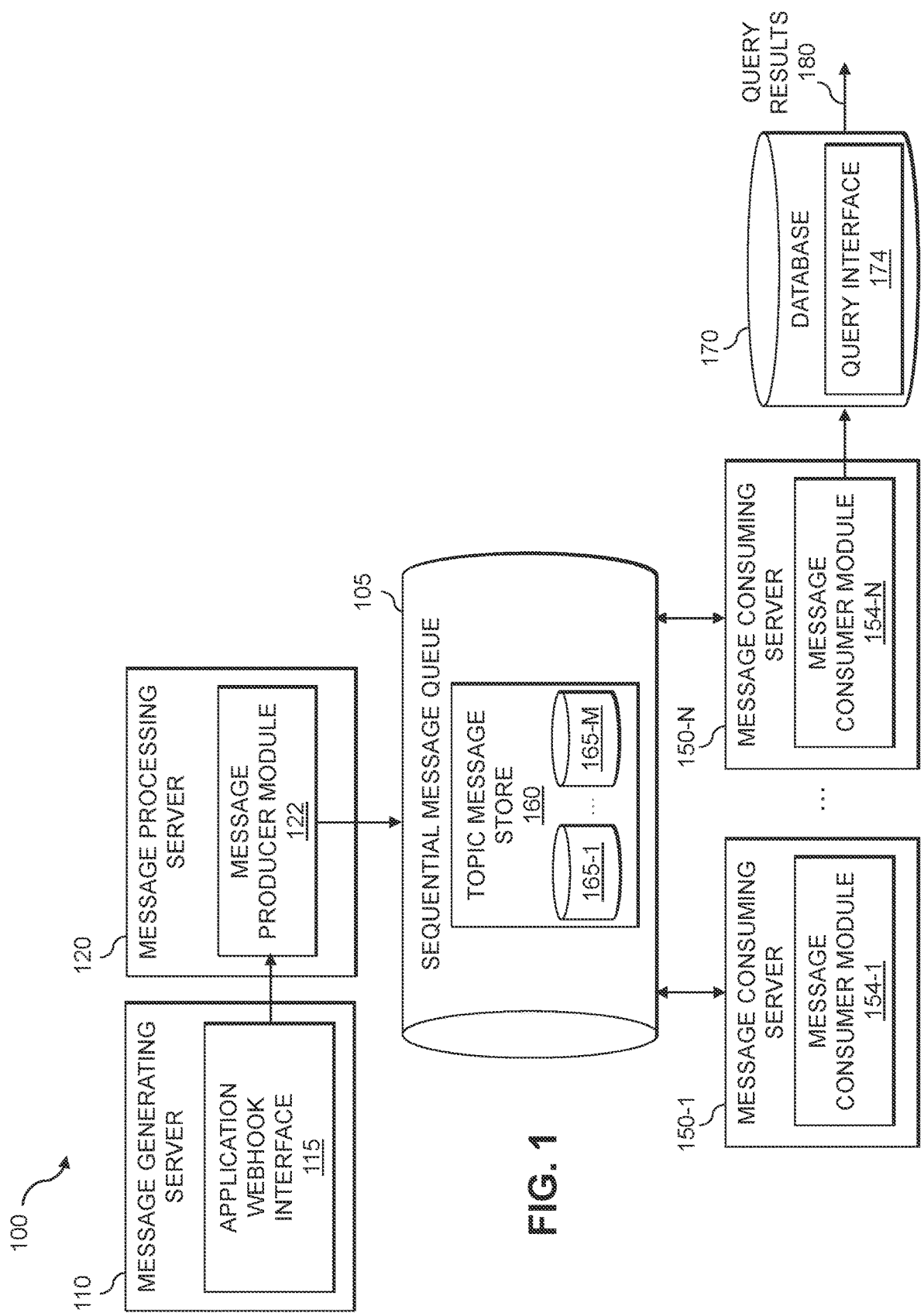
FIG. 1 illustrates an information processing system configured for distributing event messages from a first service to additional services using a message store in accordance with an illustrative embodiment.

FIG. 1 shows an information processing system 100 configured in accordance with an illustrative embodiment. The exemplary information processing system 100 comprises a message generating server 110, a message processing server 120 and one or more message consuming servers 150-1 through 150-N, collectively referred to herein as message consuming servers 150. The information processing system 100 further comprises a sequential message queue 105 and a database 170, discussed below.

In the example of FIG. 1, the message generating server 110 provides one or more event notification messages to the message processing server 120 (for example, using an application webhook interface 115) in response to an occurrence of corresponding events on the message generating server 110, as discussed further below in conjunction with FIG. 2. The message generating server 110 may be implemented as any service or application that sends event-based messages to another service or application. For example, the message generating server 110 may be implemented as a GitHub software development service, a Jira project management service, a Jenkins continuous integration tool, or an Artifactory software repository service.

The message generating server 110 may be configured, in at least some embodiments, to send as much information as possible for as many events as possible to the message processing server 120. The message processing server 120 comprises a message producer module 122 that provides the messages to a sequential message queue 105, such as an ESB, where each message is then published on the sequential message queue 105. One or more of the message consuming servers 150 consume one or more of the published messages on the sequential message queue 105. In the example of FIG. 1, the message consuming servers 150-1 through 150-N comprise respective message consumer modules 154-1 through 154-N that consume one or more of the published messages from the sequential message queue 105.

The sequential message queue 105 may be implemented, for example, as an ESB, a Kafka distributed event streaming platform, a Pulsar distributed messaging system or using RabbitMQ message-oriented middleware. An ESB is a software platform used to distribute work among connected components of an application. The ESB is designed to provide a uniform means of moving work, offering applications the ability to connect to the ESB and to subscribe to messages.

In some embodiments, the sequential message queue 105 supports publishing (e.g., writing) streams of events and subscribing to (e.g., reading) the published streams of events. The sequential message queue 105 may also store the streams of events durably and reliably. A message storage service (not shown in FIG. 1) associated with the sequential message queue 105 (e.g., a broker when the sequential message queue 105 is implemented as a Kafka distributed event streaming platform or a bookkeeper when the sequential message queue 105 is implemented as a Pulsar distributed messaging system) may publish the published event notification message to one or more topics 165-1 through 165-M associated with the sequential message queue 105, collectively referred to herein as topics 165, as part of a topic message store 160.

In addition, the message storage service associated with the sequential message queue 105 may also notify one or more of the message consuming servers 150 of the availability of new published event notification messages on the sequential message queue 105. In some embodiments, the message storage service will notify those message consuming servers 150 that subscribed to any of the topics 165 where the new published event notification message was published. In a further variation, the message consuming servers 150 can look for new messages on the sequential message queue 105.

In addition, one or more of the message consuming servers 150, such as message consuming server 150-N in the example of FIG. 1, may place a new event message in a database 170. In the example of FIG. 1, the database 170 comprises a query interface 174 that allows the event messages in the database 170 to be queried, for example, using SQL (Structured Query Language) queries, and to provide query results 180. In this manner, the event messages may be accessed by (and made available to) database-centric consumers. Thus, the database 170 provides longer term storage, a means to aggregate the data, and a means to query the data for reporting purposes using, for example, SQL.

Among other benefits, the sequential message queue 105 enables collecting event data from multiple message generating servers 110 in one place and facilitates cross correlation and querying of data from originally disparate services through data consolidation. Thus, the multi-service event data can be cross-correlated with timing information to evaluate a cause and effect of one or more events between multiple systems. For example, following a network outage, multiple resulting events occurring across multiple message generating servers 110 can be assessed to evaluate the impact of the outage across the multiple message generating servers 110. Likewise, an impact of an event that occurs with a first message generating server 110 can be assessed on one or more additional message generating servers 110.

One or more of the sequential message queue 105, message generating server 110, message processing server 120, message consuming servers 150 and database 170 may be coupled to a network, where the network in this embodiment is assumed to represent a sub-network or other related portion of a larger computer network. The network is assumed to comprise a portion of a global computer network such as the Internet, although other types of networks can be part of the computer network, including a wide area network (WAN), a local area network (LAN), a satellite network, a telephone or cable network, a cellular network, a wireless network such as a Wi-Fi or WiMAX network, or various portions or combinations of these and other types of networks. The network in some embodiments therefore comprises combinations of multiple different types of networks, each comprising processing devices configured to communicate using internet protocol (IP) or other related communication protocols.

It is to be appreciated that the term "user" is intended to be broadly construed so as to encompass, for example, human, hardware, software or firmware entities, as well as various combinations of such entities. Compute and/or storage services may be provided for users under a Platform-as-a-Service (PaaS) model, an Infrastructure-as-a-Service (IaaS) model, a Storage-as-a-Service (STaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

One or more of the sequential message queue 105, message generating server 110, message processing server 120, message consuming servers 150 and database 170 illustratively comprise processing devices of one or more processing platforms. For example, the message generating server 110 can comprise one or more processing devices each having a processor and a memory, possibly implementing virtual machines and/or containers, although numerous other configurations are possible. The processor illustratively comprises a microprocessor, a microcontroller, an application-specific integrated circuit (ASIC), a field-programmable gate array (FPGA) or other type of processing circuitry, as well as portions or combinations of such circuitry elements.

One or more of the sequential message queue 105, message generating server 110, message processing server 120, message consuming servers 150 and database 170 can additionally or alternatively be part of cloud infrastructure such as an Amazon Web Services (AWS) system. Other examples of cloud-based systems that can be used to provide at least portions of the sequential message queue 105, message generating server 110, message processing server 120, message consuming servers 150 and/or database 170 include Google Cloud Platform (GCP) and Microsoft Azure.

It is to be appreciated that this particular arrangement of interfaces 115 and 174 and modules 122, 154 illustrated in the information processing system 100 of the FIG. 1 embodiment is presented by way of example only, and alternative arrangements can be used in other embodiments. For example, the functionality associated with interfaces 115 and 174 and modules 122, 154 in other embodiments can be combined into a single interface or a single module, or separated across a larger number of interfaces or modules. As another example, multiple distinct processors and/or memory elements can be used to implement different ones of interfaces 115 and 174 and modules 122, 154 or portions thereof. At least portions of interfaces 115 and 174 and modules 122, 154 may be implemented at least in part in the form of software that is stored in memory and executed by a processor.

The exemplary message processing server 120, for example, may further include one or more additional modules and other components typically found in conventional implementations of a message processing server 120, although such additional modules and other components are omitted from the figure for clarity and simplicity of illustration.

In the FIG. 1 embodiment, the exemplary message processing server 120 is assumed to be implemented using at least one processing platform, with each such processing platform comprising one or more processing devices, and each such processing device comprising a processor coupled to a memory. Such processing devices can illustratively include particular arrangements of compute, storage and network resources.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different instances or portions of one or more of the message generating server 110, message processing server 120 and/or message consuming servers 150 to reside in different data centers. Numerous other distributed implementations of the components of the information processing system 100 are possible.

As noted above, the exemplary message consuming server 150-N can have an associated database 170 where the message consuming server 150-N can store the messages that are published to the sequential message queue 105. Although the published messages are stored in the example of FIG. 1 in a single database 170, in other embodiments, an additional or alternative instance of the database 170, or portions thereof, may be incorporated into the message consuming server 150-N or other portions of the system 100.

The database 170 in the present embodiment is implemented using one or more storage systems. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with one or more of the message generating server 110, message processing server 120, and/or message consuming servers 150 can be one or more input/output devices (not shown), which illustratively comprise keyboards, displays or other types of input/output devices in any combination. Such input/output devices can be used, for example, to support one or more user interfaces to one or more components of the information processing system 100, as well as to support communication between the components of the information processing system 100 and/or other related systems and devices not explicitly shown.

The memory of one or more processing platforms illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for distributing event messages among services using a message store is presented by way of illustrative example only, and in other embodiments additional or alternative elements may be used. Thus, another embodiment includes additional or alternative systems, devices and other network entities, as well as different arrangements of modules and other components.

Figure 2:
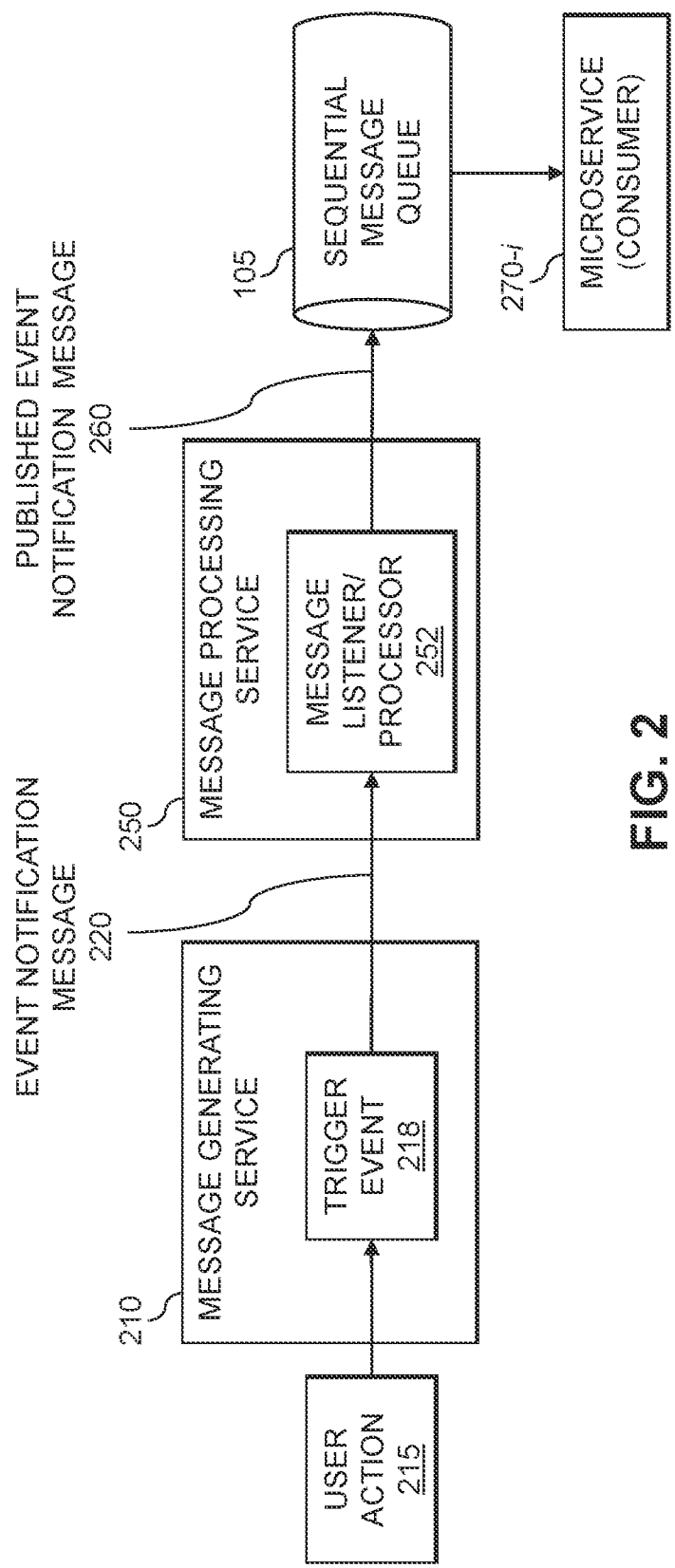
FIG. 2 illustrates a triggering and processing of an event in accordance with an illustrative embodiment.

FIG. 2 illustrates a triggering and processing of an event according to one or more embodiments. In the example of FIG. 2, an event notification message 220 is generated for each event 218 that is triggered on a first message generating service 210 (for example, in response to a user action 215). In some embodiments, a webhook is configured for the message generating service 210, and a webhook fires for each event, such as event 218. The webhook sends a payload (e.g., an event notification message 220) comprising a notification of the event 218. The webhook is posted to a particular port (for example, configured as part of the webhook) and a message listener/processor 252 of a message processing service 250 listens for event notification messages 220 on the same port (for example, configured as part of the message processing service 250).

Generally, an event 218 records the fact that something has happened, typically with respect to an operation of the message generating service 210. When the sequential message queue 105 is implemented, for example, as a Kafka distributed event streaming platform, data is read and written in the form of events. An event 218 typically has a key, a value, a timestamp, and optional metadata. Producers are those services or applications that publish (e.g., write) events to Kafka, and consumers are those services or applications that subscribe to (e.g., read and process) such published events.

In addition, upon receipt of a new event notification message 220, the message listener/processor 252 publishes the new event notification message 220 onto the sequential message queue 105 as a published event notification message 260. A message storage service associated with the sequential message queue 105 (e.g., a broker when the sequential message queue 105 is implemented as a Kafka distributed event streaming platform or a bookkeeper when the sequential message queue 105 is implemented as a Pulsar distributed messaging system) may publish the published event notification message 260 to one or more topics associated with the sequential message queue 105, as discussed above. In addition, the message storage service may also notify one or more consuming services (e.g., a given microservice 270-$i$ of multiple microservices) of the availability of the new published event notification message 260 on the sequential message queue 105. In some embodiments, the message storage service will notify those services that subscribed to any of the topics where the new published event notification message 260 was published.

In one or more embodiments, the message generating server 110 of FIG. 1 may implement the message generating service 210, the message processing server 120 of FIG. 1 may implement the message processing service 250, and one or more of the message consuming servers 150 of FIG. 1 may implement the one or more microservices 270.

Figure 3:
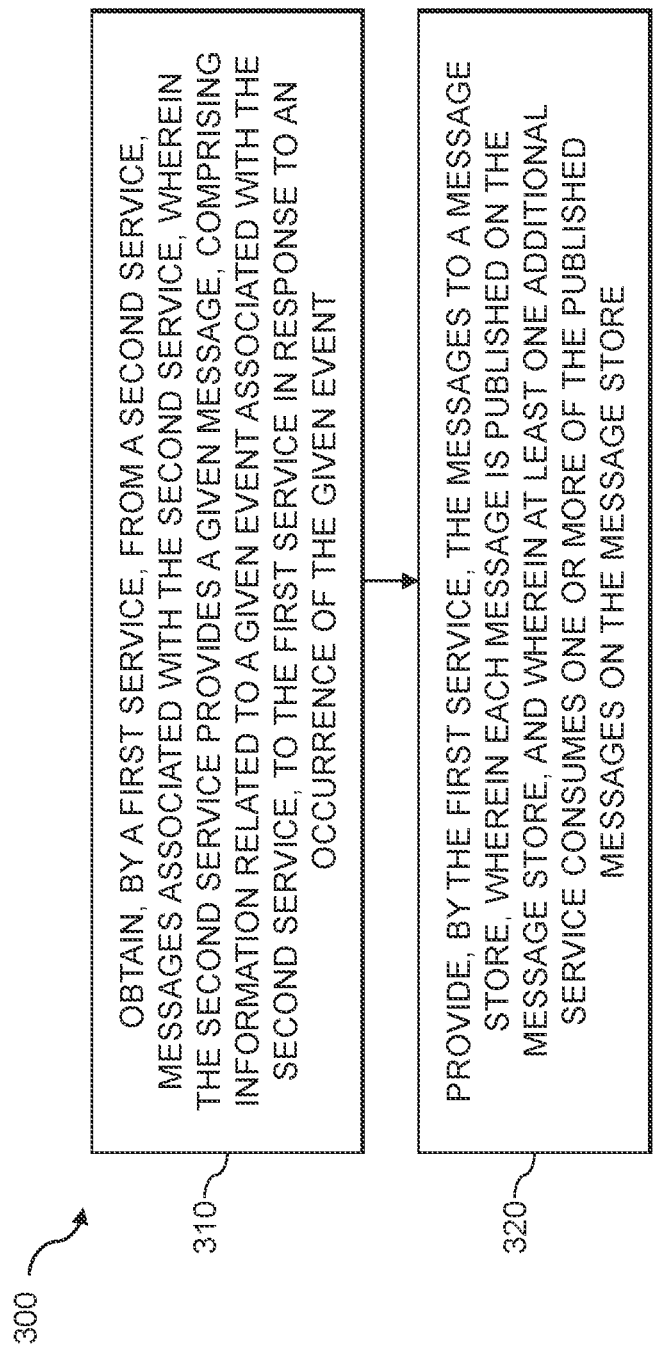
FIG. 3 is a flow diagram illustrating an exemplary implementation of a process for distributing event messages from a first service to additional services using a message store in accordance with an illustrative embodiment.

FIG. 3 is a flow diagram illustrating an exemplary implementation of a process 300 for distributing event messages from a first service to additional services using a message store in accordance with an illustrative embodiment. In the example of FIG. 3, the process 300 initially obtains, by a first service, from a second service, messages associated with the second service in step 310, wherein the second service provides a given message, comprising information related to a given event associated with the second service, to the first service in response to an occurrence of the given event.

In step 320, the process 300 provides, by the first service, the messages to a message store, wherein each message is published on the message store, and wherein at least one additional service consumes one or more of the published messages on the message store.

In some embodiments, the message store comprises a sequential message queue implemented using an event streaming platform. The message store may comprise an event stream that serializes the messages according to a time of each respective message.

The first service may obtain the messages from the second service (e.g., substantially all of the event-related messages generated by the second service) by the second service providing the messages to a specified destination. The messages may also be provided for storage in a data store that supports access (e.g., query access) by the at least one additional service.

In one or more embodiments, the message store supports one or more topics, wherein each message is published to one or more of the topics, and wherein the at least one additional service consumes a plurality of messages of a given topic in an order that the plurality of messages was written to the message store. The messages can be published to at least one of the topics on the message store using a message storage service associated with the message store.

The message store may comprise a plurality of messages generated by a plurality of services and wherein an impact of at least one event associated with at least one given service can be assessed on one or more additional services (e.g., using cross correlation techniques).

The particular processing operations and other network functionality described in conjunction with the flow diagram of FIG. 3 are presented by way of illustrative example only, and should not be construed as limiting the scope of the disclosure in any way. Alternative embodiments can use other types of processing operations for distributing event messages among services using a message store. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

FIG. 4 illustrates exemplary pseudo code 400 for creating webhooks with the message generating service 210 of FIG. 2 and for processing received webhook messages in accordance with an illustrative embodiment. In the example of FIG. 4, the exemplary message processing service 250 of FIG. 2 initially creates one or more webhooks to be used as a "firehose" from the message generating service 210 (e.g., the GitHub software development service). For example, the message processing service 250 can create a webhook on a given endpoint using a graphical user interface (GUI) and/or an application programming interface (API) provided by the message generating service 210. In some implementations, the GUI and/or API allows the message processing service 250 to specify a particular network address (e.g., in the form of IP:PORT) as a webhook endpoint (also referred to as a payload uniform resource locator (URL)), and to select some or all events published by the message generating service 210. In the example of the GitHub software development service, events can be selected on the level of an organization, a business unit and/or a repository.

Thereafter, the message processing service 250 can monitor the specified webhook endpoint, capture webhook messages and save the captured webhook messages on an ESB, such as the sequential message queue 105 or the Kafka distributed event streaming platform (for example, using the exemplary code snippet shown in FIG. 4). The granularity of the topic associated with each message corresponds to the scope of the events selected for the webhook.

In some embodiments, the message processing service 250 (and/or a message consumer module 154) can take the content of webhook messages stored by the message processing service 250 on the ESB and store the content in a database, such as the database 170 (e.g., a database management system (DBMS)), for example, using the exemplary code snippet shown in FIG. 4. As noted above, the exemplary database 170 comprises a query interface 174 that allows the messages in the database 170 to be queried, for example, using SQL (Structured Query Language) queries, and to provide query results 180. In this manner, the event messages may be accessed by (and made available to) database-centric consumers. Thus, the database 170 provides longer term storage, a means to aggregate and/or cross-correlate the data, and a means to query the data for reporting purposes using, for example, SQL.

One or more embodiments of the disclosure provide improved methods, apparatus and computer program products for distributing event messages from a first service to additional services using a message store. The foregoing applications and associated embodiments should be considered as illustrative only, and numerous other embodiments can be configured using the techniques disclosed herein, in a wide variety of different applications.

It should also be understood that the disclosed techniques for distributing event messages among services using a message store, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for distributing event messages among services using a message store may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS, IaaS and/or FaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective instances of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based event message distribution engine, or portions thereof, are illustratively implemented for use by tenants of such a multi-tenant environment.

Cloud infrastructure as disclosed herein can include cloud-based systems such as AWS, GCP and Microsoft Azure. Virtual machines provided in such systems can be used to implement at least portions of a cloud-based event message distribution platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 5 and 6. These platforms may also be used to implement at least portions of other information processing systems in other embodiments.

Figure 5:
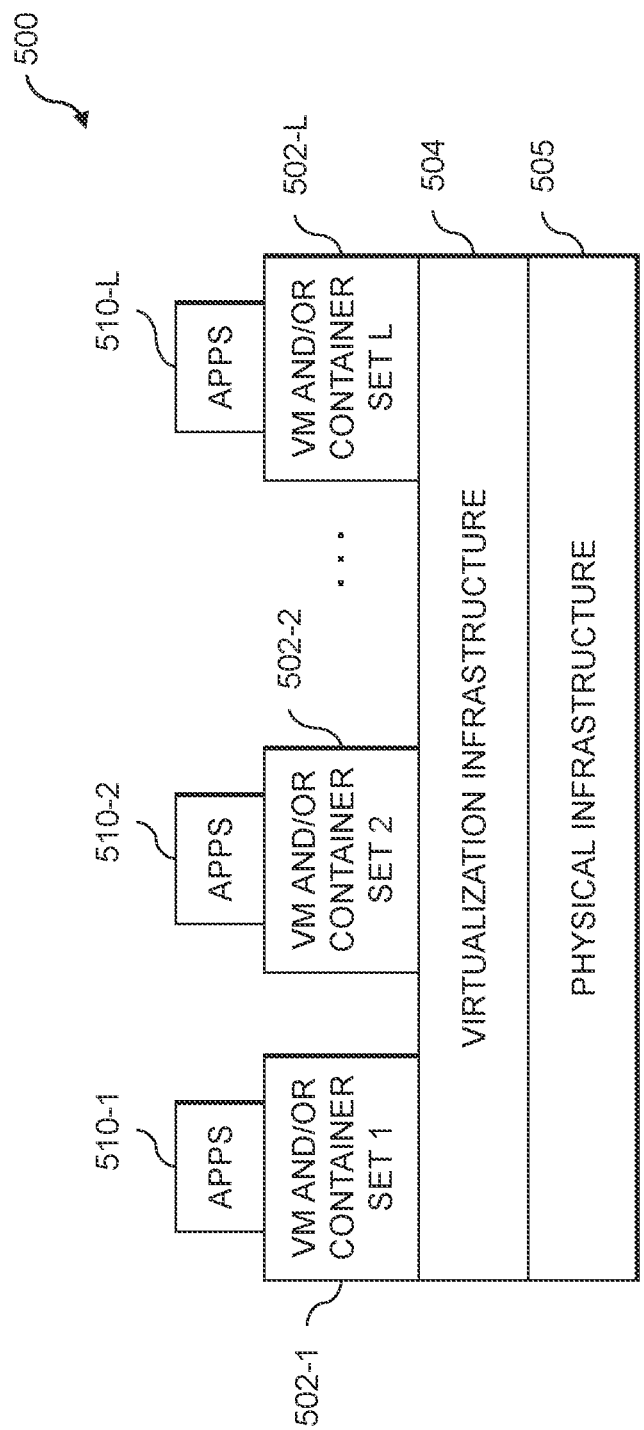
FIG. 5 illustrates an exemplary processing platform that may be used to implement at least a portion of one or more embodiments of the disclosure comprising a cloud infrastructure.

FIG. 5 shows an example processing platform comprising cloud infrastructure 500. The cloud infrastructure 500 comprises a combination of physical and virtual processing resources that may be utilized to implement at least a portion of the information processing system 100. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. Such implementations can provide event message distribution functionality of the type described above for one or more processes running on a given one of the VMs. For example, each of the VMs can implement control logic for publishing event messages to a message store and associated functionality for distributing the event messages to additional services using the message store for one or more processes running on that particular VM.

An example of a hypervisor platform that may be used to implement a hypervisor within the virtualization infrastructure 504 is the VMware® vSphere® which may have an associated virtual infrastructure management system such as the VMware® vCenter™. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system. Such implementations can provide event message distribution functionality of the type described above for one or more processes running on different ones of the containers. For example, a container host device supporting multiple containers of one or more container sets can implement one or more instances of control logic for publishing event messages to a message store and associated functionality for distributing the event messages to additional services using the message store.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises at least a portion of the given system and includes a plurality of processing devices, denoted 602-1, 602-2, 602-3, . . . 602-K, which communicate with one another over a network 604. The network 604 may comprise any type of network, such as a WAN, a LAN, a satellite network, a telephone or cable network, a cellular network, a wireless network such as WiFi or WiMAX, or various portions or combinations of these and other types of networks.

The processing device 602-1 in the processing platform 600 comprises a processor 610 coupled to a memory 612. The processor 610 may comprise a microprocessor, a microcontroller, an ASIC, an FPGA or other type of processing circuitry, as well as portions or combinations of such circuitry elements, and the memory 612, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and the given system may include additional or alternative processing platforms, as well as numerous distinct processing platforms in any combination, with each such platform comprising one or more computers, storage devices or other processing devices.

Figure 6:
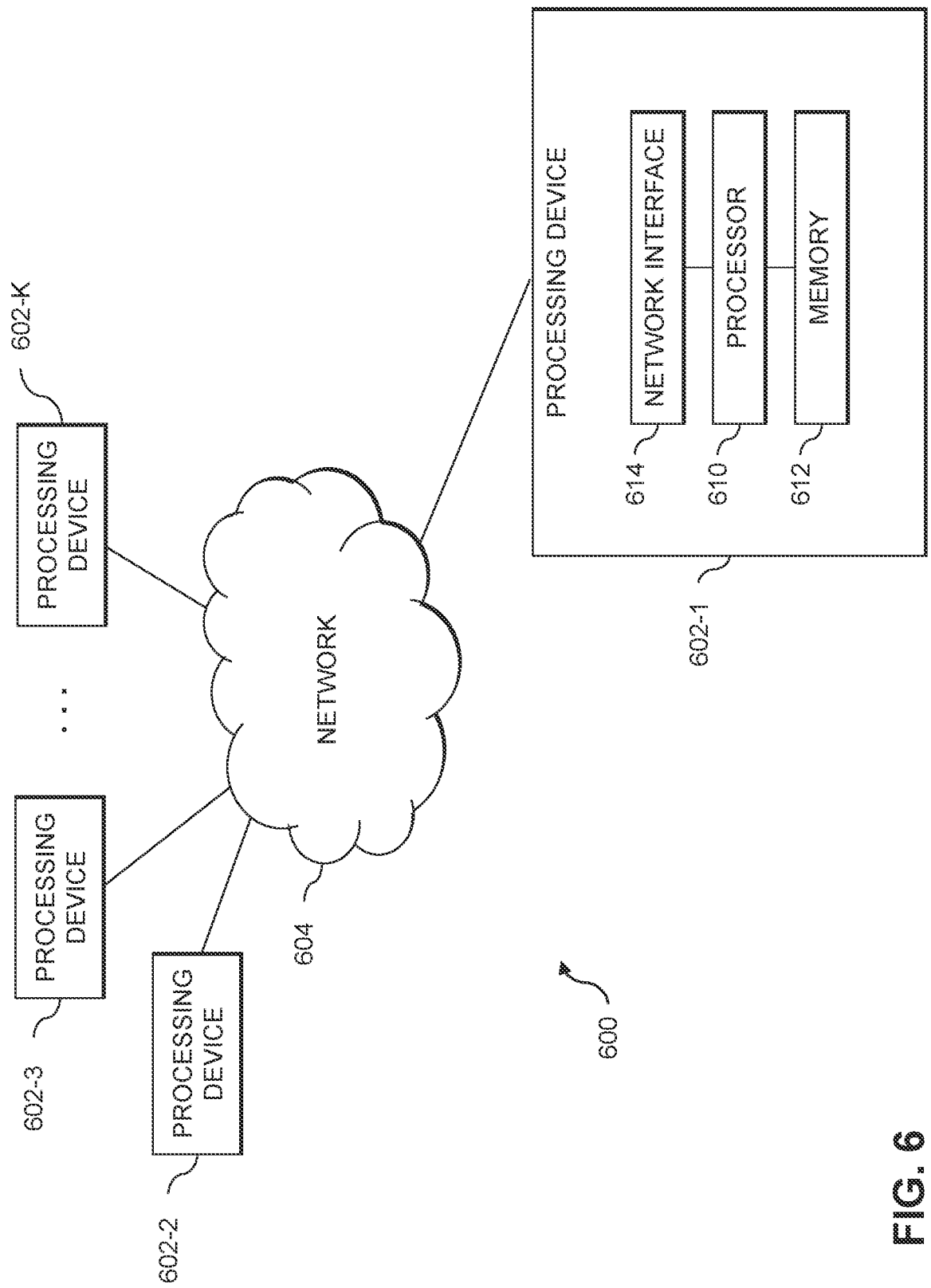
FIG. 6 illustrates another exemplary processing platform that may be used to implement at least a portion of one or more embodiments of the disclosure.

Multiple elements of an information processing system may be collectively implemented on a common processing platform of the type shown in FIGS. 5 or 6, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell Technologies.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

obtaining, by a first service, from a second service, one or more messages associated with the second service, wherein the second service provides a given message, comprising information related to a given event associated with the second service, to at least one designated destination associated with the first service in response to an occurrence of the given event, and wherein the first service monitors the at least one designated destination for one or more messages; and providing, by the first service, in response to the first service detecting the one or more messages on the at least one designated destination, the one or more messages to a message store, wherein each message is published on the message store, and wherein at least one additional service consumes one or more of the published messages on the message store, wherein the message store: (i) comprises at least one sequential message queue implemented using an event streaming platform and (ii) supports one or more topics, wherein each of the one or more messages is published to at least one of the one or more topics, and wherein the at least one additional service consumes a plurality of messages of a given topic in an order that the plurality of messages was written to the message store;

wherein the method is performed by at least one processing device comprising a processor coupled to a memory.

2. The method of claim 1, wherein the message store processes at least one event stream that serializes a plurality of messages according to a time of each respective message.

3. The method of claim 1, further comprising providing the one or more messages for storage in a data store that supports access by one or more of the at least one additional service and a user.

4. The method of claim 1, wherein the plurality of messages is published to at least one of the one or more topics on the message store using a message storage service associated with the message store.

5. The method of claim 1, wherein the one or more messages comprise the messages generated by the second service in response to an occurrence of corresponding events.

6. The method of claim 1, wherein the message store comprises a plurality of messages generated by a plurality of services and wherein an impact of at least one event associated with at least one given service can be assessed on one or more additional services.

7. The method of claim 1, wherein one or more services subscribe to a stream of events published on the at least one sequential message queue.

8. A apparatus comprising:
at least one processing device comprising a processor coupled to a memory;
the at least one processing device being configured to implement the following steps:
obtaining, by a first service, from a second service, one or more messages associated with the second service, wherein the second service provides a given message, comprising information related to a given event associated with the second service, to at least one designated destination associated with the first service in response to an occurrence of the given event, and wherein the first service monitors the at least one designated destination for one or more messages; and
providing, by the first service, in response to the first service detecting the one or more messages on the at least one designated destination, the one or more messages to a message store, wherein each message is published on the message store, and wherein at least one additional service consumes one or more of the published messages on the message store, wherein the message store: (i) comprises at least one sequential message queue implemented using an event streaming platform and (ii) supports one or more topics, wherein each of the one or more messages is published to at least one of the one or more topics, and wherein the at least one additional service consumes a plurality of messages of a given topic in an order that the plurality of messages was written to the message store.

9. The apparatus of claim 8, wherein the message store processes at least one event stream that serializes a plurality of messages according to a time of each respective message.

10. The apparatus of claim 8, further comprising providing the one or more messages for storage in a data store that supports access by one or more of the at least one additional service and a user.

11. The apparatus of claim 8, wherein the plurality of messages is published to at least one of the one or more topics on the message store using a message storage service associated with the message store.

12. The apparatus of claim 8, wherein the one or more messages comprise the messages generated by the second service in response to an occurrence of corresponding events.

13. The apparatus of claim 8, wherein the message store comprises a plurality of messages generated by a plurality of services and wherein an impact of at least one event associated with at least one given service can be assessed on one or more additional services.

14. A non-transitory processor-readable storage medium having stored therein program code of one or more software programs, wherein the program code when executed by at least one processing device causes the at least one processing device to perform the following steps:
obtaining, by a first service, from a second service, one or more messages associated with the second service, wherein the second service provides a given message, comprising information related to a given event associated with the second service, to at least one designated destination associated with the first service in response to an occurrence of the given event, and wherein the first service monitors the at least one designated destination for one or more messages; and
providing, by the first service, in response to the first service detecting the one or more messages on the at least one designated destination, the one or more messages to a message store, wherein each message is published on the message store, and wherein at least one additional service consumes one or more of the published messages on the message store, wherein the message store: (i) comprises at least one sequential message queue implemented using an event streaming platform and (ii) supports one or more topics, wherein each of the one or more messages is published to at least one of the one or more topics, and wherein the at least one additional service consumes a plurality of messages of a given topic in an order that the plurality of messages was written to the message store.

15. The non-transitory processor-readable storage medium of claim 14, wherein the message store processes at least one event stream that serializes a plurality of messages according to a time of each respective message.

16. The non-transitory processor-readable storage medium of claim 14, further comprising providing the one or more messages for storage in a data store that supports access by one or more of the at least one additional service and a user.

17. The non-transitory processor-readable storage medium of claim 14, wherein the plurality of messages is published to at least one of the one or more topics on the message store using a message storage service associated with the message store.

18. The non-transitory processor-readable storage medium of claim 14, wherein the one or more messages comprise the messages generated by the second service in response to an occurrence of corresponding events.

19. The non-transitory processor-readable storage medium of claim 14, wherein the message store comprises a plurality of messages generated by a plurality of services and wherein an impact of at least one event associated with at least one given service can be assessed on one or more additional services.

20. The non-transitory processor-readable storage medium of claim 14, wherein one or more services subscribe to a stream of events published on the at least one sequential message queue.

\* \* \* \* \*